US012468192B2

(12) United States Patent
Luo

(10) Patent No.: US 12,468,192 B2
(45) Date of Patent: Nov. 11, 2025

(54) BACKLIGHT STRUCTURE AND ELECTRONIC DEVICE

(71) Applicant: JRD COMMUNICATION (SHENZHEN) LTD., Shenzhen (CN)

(72) Inventor: Guangyue Luo, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 24 days.

(21) Appl. No.: 18/236,973

(22) Filed: Aug. 23, 2023

(65) Prior Publication Data

US 2024/0045266 A1    Feb. 8, 2024

Related U.S. Application Data

(63) Continuation of application No. PCT/CN2021/083171, filed on Mar. 26, 2021.

(30) Foreign Application Priority Data

Feb. 25, 2021  (CN) ..................... 202110210964.9

(51) Int. Cl.
G02F 1/13357    (2006.01)
F21V 8/00    (2006.01)
(Continued)

(52) U.S. Cl.
CPC ......... G02F 1/133605 (2013.01); G02B 1/04 (2013.01); G02B 6/0051 (2013.01);
(Continued)

(58) Field of Classification Search
CPC ........... G02F 1/133613; G02F 1/13338; G02F 1/133606; G02F 1/133608; G02B 1/04;
(Continued)

(56) References Cited

U.S. PATENT DOCUMENTS 10,520,662 B1 * 12/2019 Chen ..................... G02F 1/1333
2007/0153119 A1 * 7/2007 Bilbrey ................. H04N 7/142
348/E5.042
(Continued)

FOREIGN PATENT DOCUMENTS

CN    101322069 B *  9/2010 ............. G02F 1/153
CN    109116628 A    1/2019
(Continued)

OTHER PUBLICATIONS

PCT International Search Report for International Application No. PCT/CN2021/083171, mailed on Nov. 24, 2021, 5pp.
(Continued)

*Primary Examiner* — Abdulmajeed Aziz
*Assistant Examiner* — Jessica M Apenteng
(74) *Attorney, Agent, or Firm* — The Roy Gross Law Firm, LLC; Roy D. Gross

(57) ABSTRACT

The present application provides a backlight structure and an electronic device. The backlight structure includes a first backlight module; a light reflecting plate including a horizontal portion and a bending portion connected with the horizontal portion, where the horizontal portion is provided with a first through-hole and the bending portion forms a second through-hole; and a second backlight module having a third through-hole and a light emitting surface, where the bending portion is located in the third through-hole and configured to reflect a light ray incident into the second backlight module and passing through a side wall of the third through-hole to the light emitting surface.

16 Claims, 1 Drawing Sheet

(51) Int. Cl.
 *G02B 1/04* (2006.01)
 *G02F 1/1333* (2006.01)
 *G02F 1/1335* (2006.01)

(52) U.S. Cl.
 CPC ......... *G02B 6/0055* (2013.01); *G02B 6/0065* (2013.01); *G02F 1/13338* (2013.01); *G02F 1/133606* (2013.01); *G02F 1/133608* (2013.01); *G02F 1/133613* (2021.01)

(58) Field of Classification Search
 CPC ... G02B 6/0051; G02B 6/0055; G02B 6/0065
 See application file for complete search history.

(56) References Cited

U.S. PATENT DOCUMENTS

2016/0109636 A1  4/2016  Weng
2021/0072594 A1* 3/2021 Zhang ............... G02F 1/133603
2022/0082752 A1* 3/2022 Ma .......................... G02B 6/005
2022/0236475 A1* 7/2022 Cai ....................... G02B 6/0051

FOREIGN PATENT DOCUMENTS

| CN | 110609415 A | 12/2019 |
| CN | 210109517 U | 2/2020 |
| CN | 111458935 A | 7/2020 |

OTHER PUBLICATIONS

Written Opinion of the International Searching Authority for International Application No. PCT/CN2021/083171, mailed on Nov. 24, 2021, 6pp.

Chinese Office Action issued in corresponding Chinese Patent Application No. 202110210964.9 dated Jan. 19, 2022, pp. 1-6, 13pp.

* cited by examiner

BACKLIGHT STRUCTURE AND ELECTRONIC DEVICE

CROSS-REFERENCE TO RELATED APPLICATIONS

This application is a continuation of International Application No. PCT/CN2021/083171, filed on Mar. 26, 2021, which claims priority to and the benefit of Chinese Patent Application No. 202110210964.9, filed on Feb. 25, 2021. The disclosures of the aforementioned applications are incorporated herein by reference in their entireties.

TECHNICAL FIELD

The present application relates to the field of display technologies, and more particularly to a backlight structure and an electronic device.

BACKGROUND

With development of technologies and change of human aesthetics, a demand for a front screen-to-body ratio of a mobile terminal becomes higher and higher. In order to improve the screen-to-body ratio as much as possible, it is necessary to consider how to handle a front-facing camera ingeniously. Common processing methods in the related art may include a mechanical pop-up camera, a rear-facing and turning camera, and the like. However, an additional mechanical structure in the above-mentioned method may increase a weight of the mobile terminal, which is not convenient for manual use.

Currently, it is feasible to use a liquid crystal display (LCD) under-screen camera as a processing method, so that a mechanical structure is not additionally added, and a sufficiently high screen-to-body ratio can be ensured. However, when the LCD under-screen camera is used, a through-hole may be generally disposed in a backlight module in the LCD under-screen. Because a display area of the screen may need to have no black edge, a side wall of the through-hole cannot be shielded by a light shielding material, resulting in a phenomenon that light leakage occurs in the side wall. Consequently, the camera under the through hole may be interfered by stray light caused by the corresponding light leakage when acquiring an image with the camera.

Therefore, an improvement and a development of the related art may be required.

SUMMARY

An embodiment of the present application provides a backlight structure, including: a first backlight module; a light reflecting plate located on the first backlight module in a longitudinal direction and including a horizontal portion and a bending portion connected with the horizontal portion, where the horizontal portion is provided with a first through-hole disposed corresponding to the first backlight module, and the bending portion protrudes from the first through-hole toward a direction away from the first backlight module to form a second through-hole; and a second backlight module located on the horizontal portion in the longitudinal direction and provided with a third through-hole and a light emitting surface, where the bending portion is located in the third through-hole and configured to reflect a light ray incident into the second backlight module and passing through a side wall of the third through-hole to the light emitting surface.

Another embodiment of the present application further provides an electronic device, including a camera, a display screen, and the backlight structure according to any one of the above embodiments, where the display screen and the camera may be located on opposite sides of the backlight structure, and the camera may be disposed corresponding to the first through-hole.

DETAILED DESCRIPTION

Figure 1:
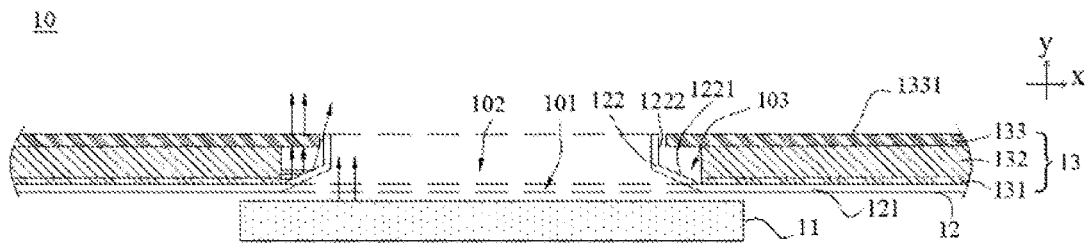
FIG. 1 is a schematic partial cross-sectional view of a backlight structure according to an embodiment of the present application.

To Specific structural and functional details disclosed herein are representative only and are for the purpose of describing exemplary embodiments of the present application. However, the present application may be specifically embodied in many alternative forms and should not be construed as limited only to the embodiments set forth herein.

In the description of the present application, it should be understood that orientations or position relationships indicated by the terms "center", "lateral", "upper", "lower", "left", "right", "vertical", "horizontal", "top", "bottom", "inside", "outside" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plurality" is two or more, unless otherwise specifically defined.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, or an electrical connection; it can be directly connected or indirectly connected through an intermediary, it can also be the connection between two elements. Those ordinary skilled in the art can understand the specific meanings of the above terms in the present application according to specific situations.

The terms used herein are only for the purpose of describing specific embodiments and are not intended to limit the exemplary embodiments. As used herein, the singular forms "a" and "an" are also intended to include the plural unless the context clearly dictates otherwise. It should be further understood that the terms "comprise" and/or "include" as used herein specify the presence of stated features, integers, steps, operations, elements and/or components but do not preclude the presence or addition of one or more other features, integers, steps, operations, elements, components and/or combinations thereof.

The present application will be further described below with reference to the accompanying drawings and embodiments. In the drawings, units with similar structures are indicated by the same reference numerals.

FIG. 1 is a schematic partial cross-sectional view of a backlight structure according to an embodiment of the present application. In FIG. 1, a longitudinal direction may be represented by an y direction, and a horizontal direction may be represented by an x direction. The backlight structure 10 may include a first backlight module 11, a light reflecting plate 12, and a second backlight module 13. The light reflecting plate 12 may be located on the first backlight module 11 in the y direction and include a horizontal portion 121 and a bending portion 122 connected with the horizontal portion 121, where the horizontal portion 121 may be provided with a first through-hole 101 disposed corresponding to the first backlight module 10, and the bending portion may protrude from the first through-hole 101 toward a direction away from the first backlight module 11 to form a second through-hole 102.

Specifically, the light reflecting plate 12 may be preferably made of a material of lightweight metal such as iron or magnesium. Additionally, the light reflecting plate 12 may also be made of a combination of metal and plastic. For example, the light reflecting plate 12 may be an integrated light reflecting plate of the plastic and the iron. That is, the bending portion 122 may be made of an iron material, and the horizontal portion may be made of a plastic material. When the light reflecting plate 12 may be made of the above materials, it is possible to ensure both the lightweight of the backlight structure and a certain mechanical strength of the backlight structure.

The light reflecting plate 12 may be fixedly connected to the first backlight module 11 by an adhesive. When the light reflecting plate 12 is fixedly connected to the first backlight module 11 by the adhesive, the first backlight module 11 may be fixedly connected to the light reflecting plate 12 by using a double-sided adhesive.

The second backlight module 13 may be located on the horizontal portion 121 in the y direction. The second backlight module 13 may be provided with a third through-hole 103 and a light emitting surface 1331, and the bending portion 122 may be located in the third through-hole 103 and configured to reflect a light ray incident into the second backlight module 13 and passing through a side wall of the third through-hole 103 to the light emitting surface 1331.

Specifically, the light emitting surface 1331 may provide backlight to other areas except areas occupied by the first through-hole 101 and the second through-hole 102.

The bending portion 122 may include an inclined surface 1221 connected to the horizontal portion 121 and a longitudinal surface 1222 connected to the inclined surface 1221, where an included angle between the inclined surface 1221 and the horizontal portion 121 may be an obtuse angle.

Specifically, the included angle between the inclined surface 1222 and the horizontal portion 121 may be preferably an obtuse angle not less than 135°, and may be 135°, 145°, or the like. The included angle between the longitudinal surface 1222 and the inclined surface 1221 may be equal to the included angle between the inclined surface 1221 and the horizontal portion 121. When the included angle may be set to be an obtuse angle, on the one hand, it is advantageous for the inclined surface 1221 to reflect a light ray passing through a side wall of the third through-hole 103 and emitted from the second backlight module 13 in the x direction to the light emitting surface 1331 in the y direction, and on the other hand, it is advantageous for the inclined surface 1221 to reflect the light ray passing through the side wall of the third through-hole 103 and emitted from the second backlight 13 in other direction onto the longitudinal surface 1222 of the bending portion 122 directly. The longitudinal surface 1222 may be configured to block the light ray directed thereto.

It should be further noted that the light ray emitted from the side wall of the third through-hole 103 may be firstly reflected into a light incident surface (not shown) of the second backlight module 13 by the inclined surface 1221 and then emitted from the light emitting surface 1331.

Polishing may be performed on the inclined surface 1221. Specifically, when the light reflecting plate 12 may be preferably made of a material of lightweight metal such as iron or magnesium, the light ray can be reflected to a certain extent because a metal surface itself has a certain gloss. Therefore, after the polishing has been performed on the light reflecting plate 12, a reflection capability of the inclined surface 1221 is further enhanced, and the light ray emitted from the second backlight module 13 through the side wall of the third through-hole 103 can be better reflected to the light emitting surface 1331.

In the present embodiment of the present application, the light ray emitted from the second backlight module 13 through the side wall of the third through-hole 103 can be reflected to the light emitting surface 1331 by the inclined surface 1221 of the bending portion 122 of the light reflecting plate 12, and the light ray directed to a longitudinal surface 1222 can be blocked by the longitudinal surface 1222, so that the light ray emitted from the side wall of the third through-hole 103 can be prevented from entering the area occupied by the first through-hole 101 and the second through-hole 102, thereby improving the phenomenon that light leakage occurs in the side wall of the through-holes of the backlight module. Additionally, the inclined surface 1221 may be also configured to reflect the light ray passing through the side wall of the third through-hole 103 and emitted from the second backlight module 13 onto the longitudinal surface 1222, thereby improving the phenomenon of the displayed black edge caused by introducing the light reflecting plate 12.

As can be seen from FIG. 1, although the phenomenon that light leakage occurs in the side wall of the through-holes of the backlight module and the phenomenon of the displayed black edge caused by introducing the light reflecting plate 12 are improved after the light reflecting plate 12 is introduced, the light ray reflected by the inclined surface 1221 onto the longitudinal surface 1222 may be very limited. Therefore, when the backlight structure 10 is actually applied to an electronic device, the phenomenon of the displayed black edge can be improved, but the phenomenon of uneven display brightness may occur in a display screen of the electronic device. To solve this problem, another embodiment of the present application provides another backlight structure to further optimize the backlight structure shown in FIG. 1.

Figure 2:
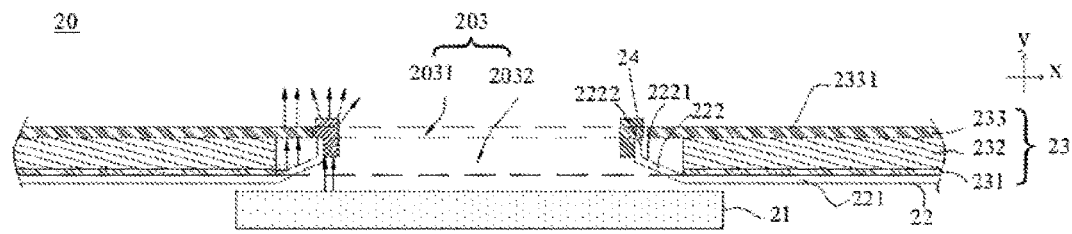
FIG. 2 is a schematic partial cross-sectional view of another backlight structure according to another embodiment of the present application.

FIG. 2 is a schematic partial cross-sectional view of another backlight structure according to another embodiment of the present application. The backlight structure 20 may include a first backlight module 21, a light reflecting plate 22, and a second backlight module 23. In the present embodiment, the first backlight module 21, the light reflecting plate 22, and the second backlight module 23 have the same structure and relative position relationship as those described in the above embodiments shown in FIG. 1. Except for the first through-hole and the second through-hole, of which positions may refer to the structure in the embodiments shown in FIG. 1), and the same structure as those described in the above embodiments shown in FIG. 1 may be shown in FIG. 2. It should be specifically noted that, preferred materials of some structures in the embodiment shown in FIG. 1 may be all applicable to the present embodiment. Additionally, as shown in FIG. 2, a bending portion 222 in FIG. 2 may protrude from the first through-hole toward a direction away from the first backlight module 21 to form a second through-hole having a hole depth less than a hole depth of the second through-hole shown in FIG. 1.

The second backlight module 23 may include a reflective film 231 located on the horizontal portion 221 in the y direction, and a light guide plate 232 and an optical film layer 233 sequentially stacked on the reflective film 231.

Specifically, light guide points (not shown) may be provided on a side surface of the light guide plate 232. When light rays reach the light guide points, the light guide points may diffuse the light rays in various angles, so that the light guide plate 232 can emit light uniformly by using the light guide points having different densities and sizes. The material of the light guide plate 232 is preferably polymethyl methacrylate. The light guide plate 232 has better optical performance and superior light transmittance.

Additionally, the reflective film 231 may be configured to reflect a light ray leaking from the light guide plate 232 onto the surface of the reflective film 231 back into the light guide plate 232, thereby reducing a light loss and improving a use efficiency of the light ray.

The optical film layer 233 may include a diffusion film (not shown) and a brightening film (not shown) sequentially stacked on the light guide plate 232. The diffusion film may mainly function to diffuse a light ray emitted from the light guide plate 232 in the second backlight module 23. When the light ray emitted from the light guide plate 232 may be diffused through the diffusion film, the second backlight module 23 may become a secondary light source with a larger area, better uniformity, and stable chromaticity. Additionally, the diffusion film may further function to protect an optical material from damage. The material of the diffusion film is preferably a polycarbonate, which has a strong ability to diffuse a light ray and is more resistant to moisture and advantageous for increasing the service life.

The brightening film may mainly function to improve a luminous efficiency of the backlight module in the second backlight module 23. A prism structure is uniformly and neatly covered on the upper surface of the brightening film. By using a special prism structure of the brightening film, light rays emitted from the diffusion film and uniformly diverged toward various angles can be converged in the y direction by optical principles such as refraction, total reflection, and light accumulation, and the brightness of the light emitting surface 2331 can be improved without increasing the total luminous flux.

Specifically, an inclined surface 2221 may reflect the light ray passing through the side wall of the third through-hole 203 and emitted from the second backlight module 23 to the light emitting surface 2331 of the optical film layer 233, and a longitudinal surface 2222 may be configured to block the light ray directed to the longitudinal surface 2222.

As shown in FIG. 2, the third through-hole 203 may include a first hole 2031 and a second hole 2032 in communication with the first hole 2031, the first hole 2031 penetrates through the optical film layer 233, the second hole 2032 penetrates through the light guide plate 222 and the reflective film 231, an aperture of the first hole 2031 is less than an aperture of the second hole 2032, the bending portion 222 is located in the second hole 2032, and the aperture of the second hole 2032 is greater than an aperture of the second through-hole.

Specifically, when the aperture of the first hole 2031 is less than the aperture of the second hole 2032, the inclined surface 2221 can reflect the light ray passing through the side wall of the second hole 2032 to the light emitting surface 2331 of the optical film layer 233.

It should be further noted that the light ray emitted from the side wall of the second hole 2032 may be firstly reflected into a light incident surface (not shown) of the optical film layer 233 by the inclined surface 2221 and then emitted from the light emitting surface 2331.

As shown in FIG. 2, the backlight structure may further include an astigmatic gasket 24 extending from the first hole 2031 into the second through-hole, where the astigmatic gasket 24 is secured to the bending portion 222 and configured for scattering a light ray emitted from the second backlight module 23 into the astigmatic gasket 24 through the first hole 2031 and a light ray emitted from the first backlight module 21 into the astigmatic gasket 24.

Specifically, as shown in FIG. 2, on the one hand, the astigmatic gasket 24 may be configured to scatter a light ray emitted from the second backlight module 23 through the side wall of the first hole 2031 into the astigmatic gasket 24 to attenuate the light ray incident from the side wall of the first hole 2031 into an area occupied by the second through-hole, thereby improving the phenomenon of light leakage in the side wall of the through-hole of the optical film layer 233. On the other hand, the astigmatic gasket 24 may be configured to scatter the light ray emitted from the first backlight module 21 into the astigmatic gasket 24, so that the light ray scattered from the astigmatic gasket 24 can be reflected onto the longitudinal surface 2222 of the bending portion 222. That is, the phenomenon of uneven brightness in the vicinity of the through-hole can be further avoided on the basis of improving the phenomenon of the black edge caused by the bending portion 222.

The astigmatic gasket 24 may include a step surface that is adhesively secured to the bending portion 222.

Specifically, the step surface may include a longitudinal surface and a horizontal surface and can be secured to the bending portion 222 by an adhesive applied to the longitudinal surface and/or the horizontal surface. In the present embodiment, in order not to affect a scattering effect of the light ray by the astigmatic gasket 24, it is necessary to ensure that the adhesive has a certain light transmittance. Therefore, the step surface is preferably secured to the bending portion 222 by a gray or white double-sided adhesive.

The astigmatic gasket 24 may have a manufacturing material of silica gel.

Specifically, in order to ensure an astigmatic effect corresponding to the astigmatic gasket, it is preferable that the material of the astigmatic gasket 24 is gray silica gel. When the material of the astigmatic gasket 24 is preferably silica gel, the astigmatic gasket 24 preferably has a thickness of 0.2 mm to 1 mm. When the thickness of the astigmatic gasket 24 is within a preferable range, the light ray can be well scattered by the astigmatic gasket 24, so that the phenomenon of light leakage of the side wall through-hole of the optical film layer 233 can be improved, and the displayed black edge caused by the bending portion 222 can be avoided.

The astigmatic gasket 24 may be provided with a groove, and the bending portion 222 may be provided with a protrusion. Alternatively, the astigmatic gasket 24 may be provided with a protrusion, and the bending portion 222 may be provided with a groove. The protrusion may be located in the groove to engage the astigmatic gasket 24 with the bending portion 222.

Specifically, when the astigmatic gasket 24 can be engaged with the bending portion 222, there is no effect of the adhesive on the astigmatic effect of the astigmatic gasket 24 because no adhesive is introduced to secure the astigmatic gasket 24 to the bending portion 222. Therefore, the astigmatic effect of the astigmatic gasket 24 can be further improved.

In the second embodiment of the present application, the light ray incident into the second backlight module 23 and passing through the side wall of the second hole 2032 may be reflected to the light emitting surface 2331 by the inclined surface 2221 of the bending portion 222 of the light reflecting plate 22. The light ray directed to the longitudinal surface 2222 may be blocked by the longitudinal surface 2222. The astigmatic gasket 24 can scatter the light ray emitted from the second backlight module 23 through the first hole 2031 into the astigmatic gasket 24 and the light ray emitted from the first backlight module 21 into the astigmatic gasket 24, so that the phenomenon of uneven brightness in the vicinity of the through-hole of the backlight module is further avoided on the basis of improving both the phenomenon of light leakage in the side wall of the through-hole of the backlight module 23 and the phenomenon of the displayed black edge caused by introducing the light reflecting plate.

An embodiment of the present application may further provide an electronic device including the backlight structure described in the above embodiments shown in FIGS. 1-2. The electronic device according to the present embodiment can be now constructed by taking the backlight structure in the embodiment shown in FIG. 2 as an example.

Figure 3:
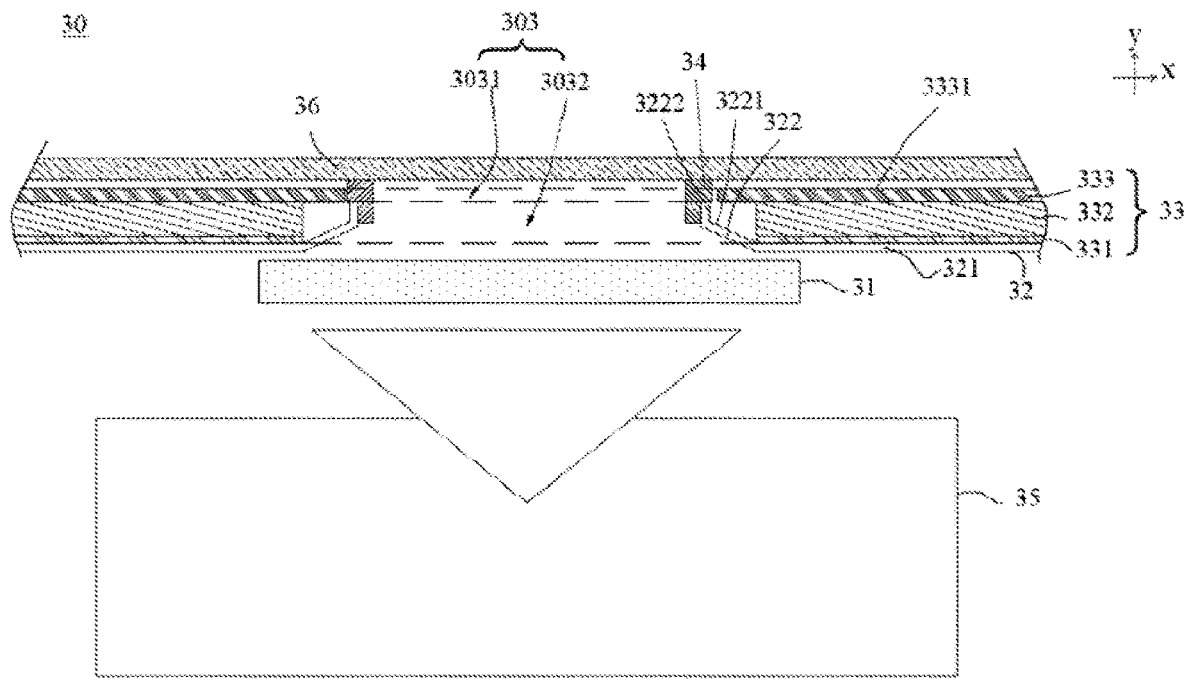
FIG. 3 is a schematic partial cross-sectional view of an electronic device according to yet another embodiment of the present application.

FIG. 3 is a schematic partial cross-sectional view of an electronic device according to yet another embodiment of the present application. The electronic device 30 may include a first backlight module 31, a light reflecting plate 32, a second backlight module 33, an astigmatic gasket 34, a camera 35, and a display screen 36. The first backlight module 31, the light reflecting plate 32, the second backlight module 33, and the astigmatic gasket 34 in the present embodiment have the same structure and relative position relationship as those shown in FIG. 2.

The display screen 36 and the camera 35 may be located on opposite sides of the backlight structure, and the camera 35 may be disposed corresponding to the first through-hole (not shown).

Specifically, the display screen 36 may be provided on an optical film layer 333 in a second backlight module 33. The display screen 36 may include an upper polarizer, a color filter, a liquid crystal, a Thin Film Transistor (TFT) substrate, and a lower polarizer sequentially stacked, for displaying information such as an image and a text. The display screen 36 may be fixedly connected to the optical film layer 333 by an adhesive. In the present embodiment, in order to provide sufficient backlight to the display screen 36, it is necessary to ensure that the adhesive has certain light transmittance. Therefore, it is preferable that the gray or white double-sided adhesive may be used as the adhesive to connect the display screen 36 with the optical film layer 333.

Further, the display screen 36 may be connected to the bending portion 322 by the astigmatic gasket 34. The astigmatic gasket 34 can buffer a hard contact of the light reflecting plate 32 with the display screen 36 and prevent damage to the display screen 36. Additionally, tight attachment of the astigmatic gasket 34 to the display screen 36 can further prevent a gap between the bending portion 322 and the display screen 36 from leaking light.

The camera 35 may be provided corresponding to the first through-hole and configured for collecting image information through the first through-hole.

The first backlight module 31 may include electrochromic glass.

Specifically, the electrochromic glass can adjust the display mode to a light guide mode and a transparent mode according to change of a driving voltage, so that the transition between an atomized state and the transparent state can be implemented.

The electronic device may further include a first light source (not shown) and a second light source (not shown), where the first light source is correspondingly disposed on both sides of the first backlight module 31. When the first light source is turned on, the first backlight module 31 may be adjusted to the light guide mode by setting the driving voltage of the electrochromic glass. In this case, the electrochromic glass in the atomized state may actually act as a light guide plate. That is, a light ray emitted from the first light source may be scattered by the electrochromic glass, so that the first backlight module 31 may become a surface light source that emits light uniformly and provide backlight to the area occupied by the first through-hole. The second light source is correspondingly disposed on one side of the light guide plate 332. When the second light source is turned on, a light ray emitted from the second light source may be led out by the light guide plate 332 and subjected to the action of the optical film layer 333 and the reflective film 331, so that the second backlight module 33 may provide backlight to other area except the area occupied by the first through-hole. The first light source and the second light source may be Light Emitting Diode (LED) lamps.

It should be further noted that, when the first light source is turned off, the first backlight module 31 may be adjusted to the transparent mode by setting the driving voltage of the electrochromic glass, so that the camera 35 can penetrate through the first backlight module 31 and acquire image information through the first through-hole.

It should be further noted that, when the display screen of the electronic device is in an operating state and the camera is in a dormant state, the first light source and the second light source are turned on at the same time, and the first backlight module is set to the light guide mode.

Specifically, when the second light source is turned on, the light ray emitted from the second light source may be led out by the light guide plate 332. The light ray emitted from the second backlight module 33 through the side wall of the second hole may be reflected to the light emitting surface by the inclined surface 3221 of the bending portion 322 of the light reflecting plate 32. The light ray directed to the longitudinal surface 3222 of the bending portion 322 may be blocked by the longitudinal surface 3222. As such, light leakage on the side wall of the through-hole of the backlight module 33 may be weakened. The astigmatic gasket 34 can scatter the light ray emitted from the second backlight module 33 through the first hole 2031 into the astigmatic gasket 34 and the light ray emitted from the first backlight module 31 into the astigmatic gasket 34, so as to weaken the phenomenon of a displayed black edge caused by the side wall of the through-hole of the backlight module. When the first light source is turned on, the driving voltage of the first backlight module 31 may be set so that the first backlight module 31 is in the light guide mode to provide backlight to the area occupied by the first through-hole.

When the display screen and the camera of the electronic device are both in the operating state, the first light source is turned off, the second light source is turned on, and the first backlight module is set to the transparent mode.

In the electronic device provided in the embodiments of the present application, when the first light source is turned off, the first backlight module 31 is set to be in the transparent mode by setting the driving voltage of the first backlight module 31, so that the camera 35 can penetrate through the first backlight module 31 and acquire image information through the first through-hole. Due to the effect of the backlight structure, on the one hand, it is possible to avoid the phenomenon that the black side is displayed on the display screen 36 due to the side wall of the through-hole of the backlight module, and on the other hand, it is possible to prevent most of light rays from entering the area occupied by the first through-hole through the side wall of the through-hole of the backlight module. As such, when the camera 35 acquires the image information through the first through-hole, it is possible to avoid problems, such as imaging whitening and blurring, caused by interference of the light leakage, thereby improving the imaging quality.

In summary, although preferred embodiments have been described above in the present application, the above-mentioned preferred embodiments are not intended to limit the present application. Those of ordinary skilled in the art can make various modifications and changes without departing from the spirit and scope of the present application. Therefore, the protection scope of the present application is subject to the scope defined by the claims.

What is claimed is:

1. A backlight structure, comprising:
   a first backlight module comprising electrochromic glass configured to switch between a light guide mode and a transparent mode based on changes of a driving voltage, wherein the first backlight module receives light from a first light source disposed on both sides of the first backlight module;
   a light reflecting plate located on the first backlight module in a longitudinal direction and comprising a horizontal portion and a bending portion connected with the horizontal portion, wherein the horizontal portion is provided with a first through-hole disposed corresponding to the first backlight module, and the bending portion protrudes from the first through-hole toward a direction away from the first backlight module to form a second through-hole; and
   a second backlight module located on the horizontal portion in the longitudinal direction and provided with a third through-hole and a light emitting surface, wherein the bending portion is located in the third through-hole and configured to reflect a light ray incident into the second backlight module and passing through a side wall of the third through-hole to the light emitting surface, wherein the second backlight module receives light from a second light source disposed on one side of the second backlight module;
   wherein in the light guide mode, the electrochromic glass is in an atomized state to scatter light from the first light source and provide backlight to an area occupied by the first through-hole; and
   in the transparent mode, the electrochromic glass is configured to allow incident light for image capture to pass through the first backlight module via the first through-hole to a camera disposed on a side of the first backlight module opposite to the light emitting surface,
   wherein the second backlight module comprises a reflective film located on the horizontal portion in the longitudinal direction, and a light guide plate and an optical film layer sequentially stacked on the reflective film,
   wherein the third through-hole comprises a first hole and a second hole in communication with the first hole, the first hole penetrates through the optical film layer, the second hole penetrates through the light guide plate and the reflective film, an aperture of the first hole is less than an aperture of the second hole, the bending portion is located in the second hole, and the aperture of the second hole is greater than an aperture of the second through-hole.

2. The backlight structure of claim 1, wherein the bending portion comprises an inclined surface connected to the horizontal portion and a longitudinal surface connected to the inclined surface, and an included angle between the inclined surface and the horizontal portion is an obtuse angle.

3. The backlight structure of claim 2, wherein polishing is performed on the inclined surface.

4. The backlight structure of claim 2, wherein an included angle between the inclined surface and the horizontal portion is 135°.

5. The backlight structure of claim 1, wherein the light guide plate is made of a material of polymethyl methacrylate.

6. The backlight structure of claim 1, wherein the optical film layer comprises a diffusion film and a brightening film sequentially stacked on the light guide plate.

7. The backlight structure of claim 6, wherein the diffusion film is made of a material of polycarbonate.

8. The backlight structure of claim 1, wherein the backlight structure further comprises an astigmatic gasket extending from the first hole into the second through-hole, and the astigmatic gasket is secured to the bending portion and configured for scattering a light ray incident from the second backlight module into the astigmatic gasket through the first hole and a light ray incident from the first backlight module into the astigmatic gasket.

9. The backlight structure of claim 8, wherein the astigmatic gasket comprises a step surface adhesively secured to the bending portion.

10. The backlight structure of claim 8, wherein the astigmatic gasket is provided with one of a groove and a protrusion and the bending portion is provided with the other of the groove and protrusion, to engage the astigmatic gasket with the bending portion.

11. The backlight structure of claim 8, wherein the astigmatic gasket comprises a manufacturing material of silica gel.

12. The backlight structure of claim 8, wherein the astigmatic gasket has a thickness in the range of 0.2 mm to 1 mm.

13. The backlight structure of claim 1, wherein the light reflecting plate has a manufacturing material of iron.

14. The backlight structure of claim 1, wherein the light reflecting plate is fixedly connected to the first backlight module by an adhesive.

15. An electronic device, comprising a camera, a display screen, and a backlight structure,
   wherein the backlight structure comprises:
   a first backlight module comprising electrochromic glass configured to switch between a light guide mode and a transparent mode based on changes of a driving voltage, wherein the first backlight module receives light from a first light source disposed on both sides of the first backlight module;

a light reflecting plate located on the first backlight module in a longitudinal direction and comprising a horizontal portion and a bending portion connected with the horizontal portion, wherein the horizontal portion is provided with a first through-hole disposed corresponding to the first backlight module, and the bending portion protrudes from the first through-hole toward a direction away from the first backlight module to form a second through-hole; and a second backlight module located on the horizontal portion in the longitudinal direction and provided with a third through-hole and a light emitting surface, wherein the bending portion is located in the third through-hole and configured to reflect a light ray incident into the second backlight module and passing through a side wall of the third through-hole to the light emitting surface, wherein the display screen and the camera are located on opposite sides of the backlight structure, and the camera is disposed corresponding to the first through-hole;

wherein the second backlight module receives light from a second light source disposed on one side of the second backlight module;

wherein in the light guide mode, the electrochromic glass is in an atomized state to scatter light from the first light source and provide backlight to an area occupied by the first through-hole; and in the transparent mode, the electrochromic glass is configured to allow incident light for image capture to pass through the first backlight module via the first through-hole to the camera disposed on a side of the first backlight module opposite to the light emitting surface, wherein the second backlight module comprises a reflective film located on the horizontal portion in the longitudinal direction, and a light guide plate and an optical film layer sequentially stacked on the reflective film, wherein the third through-hole comprises a first hole and a second hole in communication with the first hole, the first hole penetrates through the optical film layer, the second hole penetrates through the light guide plate and the reflective film, an aperture of the first hole is less than an aperture of the second hole, the bending portion is located in the second hole, and the aperture of the second hole is greater than an aperture of the second through-hole.

16. The electronic device of claim 15, wherein the backlight structure further comprises an astigmatic gasket extending from the first hole into the second through-hole, and the astigmatic gasket is secured to the bending portion and configured for scattering a light ray incident from the second backlight module into the astigmatic gasket through the first hole and a light ray incident from the first backlight module into the astigmatic gasket.

* * * * *